US012720113B2

(12) United States Patent
Zimmermann et al.

(10) Patent No.: US 12,720,113 B2
(45) Date of Patent: Aug. 25, 2026

(54) ERROR CONCEALMENT IN VIDEO FRAMES FOR VIDEO STREAMING SYSTEMS AND APPLICATIONS

(71) Applicant: NVIDIA Corporation, Santa Clara, CA (US)

(72) Inventors: Johannes Zimmermann, Berlin (DE); Andrija Bosnjakovic, Redmond, WA (US); Viktor Vandanov, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 76 days.

(21) Appl. No.: 18/485,490

(22) Filed: Oct. 12, 2023

(65) Prior Publication Data

US 2025/0126296 A1 Apr. 17, 2025

(51) Int. Cl.

*H04N 19/70* (2014.01)
*H04L 65/65* (2022.01)
*H04L 69/16* (2022.01)
*H04N 19/174* (2014.01)

(52) U.S. Cl.

CPC ............. *H04N 19/70* (2014.11); *H04L 65/65* (2022.05); *H04L 69/16* (2013.01); *H04N 19/174* (2014.11)

(58) Field of Classification Search

CPC ...... H04N 19/70; H04N 19/174; H04L 65/65; H04L 69/16

See application file for complete search history.

(56) References Cited

U.S. PATENT DOCUMENTS

| | | | | |
|---|---|---|---|---|
| 7,827,458 | B1 * | 11/2010 | Salsbury | H04L 1/1838 382/238 |
| 10,230,405 | B2 | 3/2019 | Lin et al. | |
| 10,741,143 | B2 | 8/2020 | Dimitrov | |
| 10,776,688 | B2 | 9/2020 | Jiang et al. | |
| 11,303,690 | B1 * | 4/2022 | Bhattacharyya | H04N 21/2187 |
| 11,775,829 | B2 | 10/2023 | Karras et al. | |
| 11,889,122 | B2 | 1/2024 | Kottana et al. | |
| 2004/0122680 | A1 * | 6/2004 | McGowan | H04L 65/80 704/E19.003 |

(Continued)

FOREIGN PATENT DOCUMENTS

| | | | | |
|---|---|---|---|---|
| TW | I475842 | * | 1/2006 | |
| TW | 201349791 A | * | 12/2013 | H04W 72/542 |
| WO | WO-2004043074 | * | 11/2003 | |

OTHER PUBLICATIONS

Rapaport, AVI translation of TW 201349791 A Feb. 18, 2013 (Year: 2013).*

(Continued)

*Primary Examiner* — Zaihan Jiang

(74) *Attorney, Agent, or Firm* — Foley & Lardner LLP

(57) ABSTRACT

In various examples, systems and methods are disclosed relating to error concealment by replacing a lost video frame region with a chronological predecessor. Network packets including data corresponding to an encoded bitstream of a frame of a video stream can be received. In response to determining that at least one packet of the video stream has been lost, a region of the video frame corresponding to the lost network packet can be replaced with the same region of a previous frame of the video stream.

12 Claims, 6 Drawing Sheets

(56) References Cited

U.S. PATENT DOCUMENTS

2005/0220027 A1* 10/2005 Setton .................. H04L 65/756 370/241
2005/0229072 A1* 10/2005 Setton ............. H04N 21/44209 714/748
2005/0268200 A1* 12/2005 Garudadri ............. H04N 19/39 714/746
2006/0291468 A1* 12/2006 Bopardikar ............ H04L 65/65 370/392
2007/0157001 A1* 7/2007 Ritzau .................... G06F 12/08 711/170
2012/0170523 A1* 7/2012 Civanlar ........ H04N 21/234327 370/328
2014/0043424 A1* 2/2014 Gava ................. H04N 21/4788 348/E7.078
2014/0122566 A1* 5/2014 Spracklen ........... H04N 19/895 709/203
2014/0278418 A1* 9/2014 Chen .................... G10L 19/005 704/246

OTHER PUBLICATIONS

Jeffrey Huang translation of TW I475842 Jan. 6, 2006 (Year: 2006).*

* cited by examiner

ERROR CONCEALMENT IN VIDEO FRAMES FOR VIDEO STREAMING SYSTEMS AND APPLICATIONS

BACKGROUND

Video streaming involves encoding and transmitting video data over a network to a remote client device, which subsequently decodes the video. One drawback to video streaming is the occurrence of lost video data during streaming, which may be caused by factors such as network latency and packet loss. Packet loss may cause significant artifacts or latency that can have a detrimental effect on the overall streaming experience. The effects of lost video data are particularly evident in situations where low-latency streaming is required, such as game streaming environments.

SUMMARY

Embodiments of the present disclosure relate to error concealment by replacing a lost video frame region with a chronological predecessor. Systems and methods are disclosed that improve upon the drawbacks of conventional video streaming technology by reducing the visual significance of visual artifacts during video streaming without impairing latency. As compared with conventional systems, which may compensate for transmission losses by retrieving the lost data or omitting the lost video information altogether, the techniques described herein allow for a latency-free approach for concealing errors in video stream when packets are dropped.

At least one aspect relates to a processor. The processor can include one or more circuits. The one or more circuits can receive, from one or more servers, a plurality of network packets of an encoded bitstream, the network packets of the plurality of network packets including data corresponding to one or more regions of a frame of a video stream. The one or more circuits can determine that at least one packet has been lost. The at least one packet can correspond to a first region of the frame. In response to determining that the at least one packet has been lost, the one or more circuits can replace data corresponding to the first region of the frame with data corresponding to a same region of a previous frame of the video stream.

In some implementations, the one or more circuits can determine that the at least one packet corresponds to the frame that has been lost based at least on a timeout. In some implementations, the plurality of network packets is received via a communication protocol such as User Datagram Protocol (UDP). In some implementations, the encoded bitstream of the video stream is formatted based at least on the Real-time Transport Protocol (RTP).

In some implementations, the one or more circuits can replace the data corresponding to the first region of the frame by modifying the encoded bitstream. In some implementations, the one or more circuits can modify the encoded bitstream to include a no-op operation. In some implementations, the one or more circuits can decode the encoded video stream to generate decoded video data. In some implementations, the one or more circuits can modify the decoded video data to include decoded data from the region of a previous frame of the video stream corresponding to the first region of the frame.

In some implementations, the first region of the frame is a horizontal slice of the frame, the horizontal slice having the same width as the frame. In some implementations, the first region of the frame is a rectangular tile of the frame, the rectangular tile having at least one dimension that is lesser than or equal to dimensions of the frame. In some implementations, the encoded bitstream is encoded according to a video codec standard, such as (for example and without limitation), AVC (or h.264), HEVC (or h.265), VVC (or h.266), VP8, VP9, or AV1.

At least one aspect relates to a system. The system can include one or more processing units. The system can include one or more memory units storing instructions that, when executed by the one or more processing units, cause the one or more processing units to execute operations. The operations can include receiving, using one or more servers, a plurality of network packets of an encoded bitstream, network packets of the plurality of network packets including data corresponding to one or more regions of a frame of a video stream. The operations can include determining that at least one packet has been lost. The at least one packet can correspond to a first region of the frame. The operations can include replacing data corresponding to the first region of the frame with data corresponding to a same region of a previous frame of the video stream in response to determining that the at least one packet has been lost.

In some implementations, the system is included in at least one of a control system for an autonomous or semi-autonomous machine, a perception system for an autonomous or semi-autonomous machine, a system for performing simulation operations, a system for performing digital twin operations, a system for performing light transport simulation, a system for performing collaborative content creation for 3D assets, a system for performing deep learning operations, a system implemented using an edge device, a system implemented using a robot, a system for performing conversational AI operations, a system for generating synthetic data, a system incorporating one or more virtual machines (VMs), a system implemented at least partially in a data center, or a system implemented at least partially using cloud computing resources.

In some implementations, the operations include determining that the at least one packet corresponding to the frame was lost based at least on a timeout. In some implementations, the operations include replacing the data corresponding to the first region of the frame by modifying the encoded bitstream. In some implementations, the operations include modifying the encoded bitstream to include a logical no-op operation. In some implementations, the operations include decoding the encoded video stream to generate decoded video data. In some implementations, the operations include modifying the decoded video data to include decoded data from the region of the previous frame of the video stream corresponding to the first region of the frame.

At least one aspect is related to a method. The method can include receiving, using one or more processors and from one or more servers, a plurality of network packets of an encoded bitstream, network packets of the plurality of network packets including data corresponding to one or more regions of a frame of a video stream. The method can include determining, using the one or more processors that at least one packet has been lost. The at least one packet can correspond to a first region of the frame. The method can include replacing, using the one or more processors, data corresponding to the first region of the frame with data corresponding to a same region of a previous frame of the video stream in response to determining that the at least one packet has been lost.

In some implementations, the method can include replacing, using the one or more processors, data corresponding to the first region of the frame by modifying the encoded bitstream. In some implementations, the method can include decoding the encoded video stream to generate decoded video data. In some implementations, the method can include modifying the decoded video data to include decoded data from the same region of a previous frame of the video stream.

The processors, systems, and/or methods described herein can be implemented by or included in at least one of a control system for an autonomous or semi-autonomous machine, a perception system for an autonomous or semi-autonomous machine, a system for performing simulation operations, a system for performing digital twin operations, a system for performing light transport simulation, a system for performing collaborative content creation for 3D assets, a system for performing deep learning operations, a system implemented using an edge device, a system implemented using a robot, a system for performing conversational AI operations, a system for generating synthetic data, a system incorporating one or more language models, a system incorporating one or more virtual machines (VMs), a system implemented at least partially in a data center, or a system implemented at least partially using cloud computing resources.

BRIEF DESCRIPTION OF THE DRAWINGS

The present systems and methods for error concealment by replacing a lost video frame region with a chronological predecessor are described in detail below with reference to the attached drawing figures, wherein.

DETAILED DESCRIPTION

Figure 1:
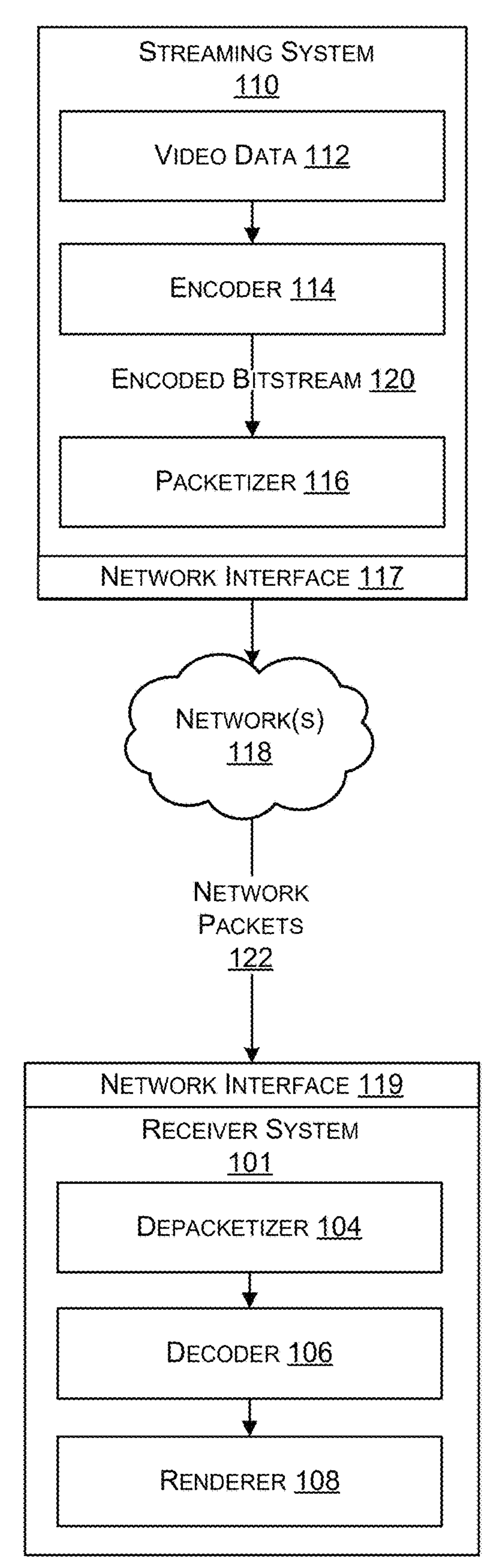
FIG. 1 is a block diagram of an example system for error concealment by replacing a lost video frame region with a chronological predecessor, in accordance with some embodiments of the present disclosure.

Systems and methods are disclosed relating to error concealment by replacing a lost video frame region with a chronological predecessor in a sequence (e.g., stream) of video frames. In some implementations, the error concealment techniques described herein may be performed by a client device that receives a video stream from a streaming server. The video stream may be a video stream provided as part of a remote gaming application or video streaming application.

The video stream can be provided by the streaming server using a suitable audio-visual streaming protocol, such as RTP. Video streams provided via such protocols can implement a codec that encodes video frames in multiple distinct regions. The regions may be—for example and without limitation—horizontal slices of the video frame or rectangular tiles of the video frame. The size and type of each region may be specified based at least on the video codec used to encode the video stream.

To improve streaming performance and reduce latency, the streaming server may utilize a transmission protocol such as UDP. Protocols such as UDP may not include built-in error correction, retransmission, or flow control mechanisms, and instead prioritize speed and simplicity over reliability. When transmitting streaming video via a streaming protocol such as RTP, individual video frames may be transmitted in sequences of network packets, with one or more packets including data or information corresponding to one or more regions of the video frame. If packets in a sequence are lost, only some but not all portions of a video frame may be ultimately received at the client device for rendering, resulting in incomplete frame data.

Upon detecting that data for one or more portions of a video frame is lost, the client device can request retransmission of the missing portions or can display replacement information in place of the lost video frame regions. In environments such as game streaming environments, where low latency is preferred over visual fidelity for some users, waiting for retransmission of packets pertaining to lost regions to complete is often not practical due to the inherent delay in communication networks. Similar consideration applies to skipping the incomplete frame region and waiting for the next one to arrive. Therefore, in such environments it is preferable to render suitable replacement data efficiently, in place of the lost video frame regions.

The techniques described herein leverage the probable similarities between consecutive video frames to conceal visual errors and lack of video data when regions of video frames are lost in a real-time video streaming system. For example, a client device receiving a video stream can detect regions of streamed video frames are lost, and can display a corresponding region of a previous frame of the video stream in its place. Because consecutive video frames often include minimal differences, visual fidelity is improved compared to omitting the lost video region entirely.

In some implementations, the client device may replace the lost region of the video frame by modifying the encoded video bitstream to include a no-op region prior to the decoding process. The net effect of the no-op region of the bitstream on the decoded image will be that the corresponding area of the video will not change relative to the previous frame. The modification may be performed by a depacketizer component of the client device, which may be responsible for constructing an encoded video bitstream from sequences of network packets received from the streaming server. Modifying the encoded bitstream avoids changing the behavior of the video decoder and rendering pipeline and improves compatibility with different types of decoders and renderers.

In some implementations, the client device may replace the lost region of the video frame after decoding and prior to rendering the video. For example, rather than modifying the encoded bitstream at the depacketizer, the rendering pipeline of the client device can instead replace the lost region with previously decoded and rendered video data of the same region of the preceding frame. For example, the renderer of the client device can copy the pixels from the previous frame that correspond to the lost region to the current frame. In some implementations, the renderer may mask off the region that was lost using scissor or clip rectangles or depth or stencil buffers to render new frames.

With reference to FIG. 1, FIG. 1 is an example computing environment including a system for error concealment by replacing a lost video frame region with the same region of another frame, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 can be utilized to provide (e.g., stream) video data 112 via the network 118 to a receiver system 101, which can perform the error concealment techniques described herein to reduce visual artifacts and latency when one or more network packets 122 carrying video data are lost. The video data 112 may correspond to video frames of a video stream generated from any suitable source, including a video playback process, a gaming process (e.g., video output from remotely executing video games), among other sources of video data. The video data 112 may be generated as an output of any process that generates frames of video information. For example, the video data 112 may be generated as an output of a rendering process for a video game executed by the streaming system 110. In a remote gaming configuration, the streaming system 110 may execute one or more game applications and may receive input data transmitted from the receiver system via the network 118 to control the game applications. Frames of the video data 112 may be generated at a variable or predetermined frame rate, including but not limited to thirty frames-per-second, sixty frames-per-second, and so on.

The encoder 114 of the streaming system 110 can encode the video data into a suitable format. Encoding the video data 112 reduces the overall amount of information that is to be transmitted to the receiver system 101. The encoder 114 may utilize any combination of hardware or software to encode the video data 112. Encoding the video data 112 can include converting the video data 112 to conform to any suitable codec standard, including but not limited to codec standards such as h.264 (AVC), h.265 (HEVC), h.266 (VVC), AV1, VP8, VP9, or any other video codec that supports segmentation of a video frame into distinct geometric regions. Encoding the video data 112 may include segmenting the video frame into one or more regions, such as slices or tiles. Each encoded slice or tile may correspond to a respective geometric region of a video frame. The geometric regions may be rectangular regions of the video frame, which may have the same width as the video frame (e.g., a horizontal slice), or a rectangular or square tile of the video frame. In some implementations, the geometric regions may be one or more macroblocks. To render the encoded bitstream 120, a downstream decoder (e.g., the decoder 106 described in further detail herein) can decode each encoded slice or tile of the encoded bitstream 120 and provide the decoded data to a renderer (e.g., the renderer 108) to generate a complete video frame. In some implementations, each encoded slice or tile of the encoded bitstream 120 may be a single decodable unit of encoded video data.

The encoder 114 can perform various compression techniques in encoding the video data 112. For example, the encoder 114 may perform intra-frame compression techniques, inter-frame compression techniques, and rate control compression techniques, including but not limited to motion estimation, quantization, and entropy coding. The encoder 114 can generate the encoded bitstream 120 from the video data 112. The encoded bitstream 120 includes the encoded video data 112 generated by the encoder 114. Portions of the encoded bitstream 120 can be tagged with one or more identifiers or tags identifying to which frame or portion of a frame the encoded bitstream 120 corresponds. The encoded bitstream 120 may include data from a portion of a video frame, the entirety of a video frame, or one or more sequences of video frames. In some implementations, the encoded bitstream 120 may include audio data, which may be generated by the encoder 114 using a suitable audio encoding process. In some implementations, audio data may be formatted as a separate bitstream.

The encoder 114 can generate and provide the encoded bitstream 120 to the packetizer 116 for transmission to the receiver system 101 via the network 118. To do so, the packetizer 116 can divide the encoded bitstream 120 into one or more network packets 122. For example, the packetizer 116 may utilize RTP, or any other protocol that provides a mapping between subsets of frame regions and streaming protocol packets. In some implementations, the sequence number of an RTP packet may be utilized to determine to which frame region the RTP packet corresponds. In some implementations, an RTP packet payload may include encoded information (e.g., a portion of the encoded bitstream 120) corresponding to a single region of a frame of the video data 112 (e.g., a single slice or tile). In some implementations, an RTP packet payload may include encoded information corresponding to multiple regions of a frame of the video data 112 (e.g., multiple slices or tiles). In some implementations, an RTP packet payload may include encoded information corresponding to a portion of a region of a frame of the video data 112, such that multiple RTP packets are utilized to construct the portion of the encoded bitstream 120 corresponding to a region (e.g., a slice or a tile) of the video data 112.

In an example implementation utilizing RTP, the packetizer 116 may generate a mapping between each network packet 122 and a corresponding frame region of video data by including a sequence number that indicates the order in which the packets should be arranged for decoding and rendering. The sequence number may be utilized by a downstream depacketizer to identify which packets in a sequence of network packets 122 have been dropped. In some implementations, additional data (e.g., metadata) may be included in each network packet 122 that designates an identifier or a location of the slice or tile of the encoded bitstream 120 included in the payload of each network packet 122. For example, the network packets 122 may include a frame identifier or a slice or tile identifier.

The packetizer 116 can generate the network packets 122 to accommodate various characteristics of the network. For example, the packetizer 116 may generate the network packets 122 to include video streaming protocol data that satisfies the size of the maximum transmission unit (MTU) of the network 118, which is the maximum size of a packet that can be transmitted over the network without being fragmented. To do so, the packetizer 116 may, in some implementations, split regions (e.g., slices, tiles, contiguous sequence(s) of macroblocks, any other logical sub-unit of a video frame that may be encoded as a distinct part of the encoded video frame's bitstream and decoded as a distinct part of the decoded video frame's data, etc.) of frames into multiple portions of RTP payload data to satisfy the MTU. In some implementations, multiple regions of a frame can be included in one or more of the network packets 122. In some implementations, a single region of a frame packet may be stratified across multiple network packets 122 in a logical sequence.

Each of the network packets 122 may be transport protocol packets that may not guarantee reliability of packet delivery. One example of such a protocol is UDP. An advantage of utilizing packets that do not guarantee delivery is decreased latency due to the lack of built-in error checking and reliability checking performed when using transport protocols that guarantee delivery of packets. The network packets 122 can be generated to include one or more frame regions (or portions thereof) as a payload, which are transmitted to the receiver system 101 as shown. The network packets 122 can be transmitted via the network interface 117 of the streaming system 110. The network interface 117 of the streaming system 110 may include any of the structure of, and implement any of the functionality of, the communication interface 418 described in connection with FIG. 4.

The receiver system 101 may be any computing system suitable to receive and process network packets 122 as described herein. The receiver system 101 can receive the network packets 122 via the network interface 119. The network interface 119 of the receiver system 101 may include any of the structure of, and implement any of the functionality of, the communication interface 420 described in connection with FIG. 4. In some implementations, the receiver system 101 may include or may be in communication with a display device that can present decoded video data generated based at least on the network packets 122. The decoded video data may be, for example, video data generated from a remote game or remote application executing on the streaming server. The receiver system 101 may implement error concealment techniques to reduce visual artifacts in the transmitted video information without introducing latency.

The depacketizer 104 of the receiver system 101 can receive the network packets 122 transmitted from the streaming system 110 and assemble one or more decodable units of video data to provide to the decoder 106. As described herein, the network packets 122 may be generated according to a protocol that does not guarantee delivery. Therefore, when assembling the decodable units of video data (e.g., decodable slices or tiles of the encoded bitstream 120), the depacketizer 104 can determine whether one or more network packets 122, and therefore one or more slices or tiles of the encoded bitstream 120, were lost during transmission.

Upon receiving the network packets 122, the depacketizer 104 can store and reorder the RTP packets included in the received network packets 122. To do so, the depacketizer 104 may utilize the sequence number of each RTP packet in the network packets 122 to ensure that the packets are reconstructed in the correct order. For example, the depacketizer 104 extracts the RTP packets from the payload of the network packets 122 and can store the RTP packets in a container-type data structure (e.g., a buffer), indexed by the sequence number of each RTP packet. As new network packets 122 are received, the depacketizer 104 can access the sequence number in the header of each RTP packet and store the RTP packet in the container data structure in the correct order. In some implementations, the depacketizer 104 may utilize multiple container data structures, including one for RTP packets received in order, and another for RTP packets received out of order. In some implementations, the depacketizer 104 may discard any duplicate packets.

Once the RTP packets have been reordered and duplicates have been discarded, the depacketizer 104 can reassemble the encoded bitstream transmitted by the streaming server 110 by concatenating the payload of each RTP packet in the correct order. For example, the encoded bitstream 120 may correspond to a frame of the video data 112, and the depacketizer 104 can reassemble the encoded bitstream 120 corresponding to the frame based at least on the payloads of each RTP packet. In doing so, the depacketizer 104 can determine that one or more network packets 122 have been lost if a missing sequence number in the sequence of RTP packets is identified. For example, RTP packets may have consecutive sequence numbers, or sequence numbers that change based at least on a predetermined pattern. The depacketizer 104 can scan through the container data structure storing the RTP packets and determine whether there are any sequence numbers that are missing. The depacketizer 104 can flag any such packets as lost or dropped.

In doing so, the depacketizer 104 may also determine the portions of the video frame to which the dropped packets correspond, for example, based at least on the packets that are flagged as dropped packets. Because the encoded bitstream 120 corresponding to the frame of the video data 112 is constructed from multiple RTP packets, the portions of the encoded bitstream 120 to which the missing packets correspond will not be properly reconstructed. As described herein, the payloads of the RTP packets may include encoded bitstream data corresponding to a single complete frame region (e.g., a slice or a tile), multiple complete frame regions, or a portion of a frame region. In some implementations, an RTP packet payload may include encoded bitstream data for two portions of two different regions of the video data 112 (e.g., multiple slices or tiles).

When assembling the encoded bitstream 120 at the receiver system, the depacketizer 104 can identify portions of the encoded bitstream 120 that are missing based at least on the missing RTP packets and can perform error concealment techniques to reduce visual artifacts in the rendered video without impacting rendering latency. For example, the error concealment techniques may be performed in parallel to and without waiting for completion of retransmission of the lost packets or arrival of affected frame regions in subsequent frames of the video bitstream, thereby eliminating the time required to request, receive, and decode the missing video data.

One approach to error concealment includes modifying the encoded bitstream to include an operation that indicates the region of the video frame corresponding to the missing packets should not change in the next frame. The particular modification to the encoded bitstream 120 may be selected based upon the codec utilized to generate the encoded bitstream. For example, when utilizing the H.264 codec, the depacketizer 104 can insert one or more "no-operation" slices in the encoded bitstream 120 assembled from the RTP packets. The no-operation slices may be macroblocks of the encoded bitstream 120 that include a flag set in its header that indicates the region of the frame is unchanged relative to the previous frame. The one or more no-operation slices can cause the corresponding missing regions of the video frame not to change relative to the content of the previous video frame in the video stream. In this non-limiting example based at least on the h.264 codec, such slices are a type of slice specified in the encoded bitstream 120 that causes the video data to be copied directly from the corresponding macroblocks of the slice in the previous frame. The depacketizer 104 can perform similar techniques to conceal errors in video streams encoded using other types of codecs, such as inserting "zero motion" or "zero residuals" frame regions in lieu of the missing frame regions of the encoded bitstream according to the respective codec of the encoded bitstream.

Figures 2A, 2B:
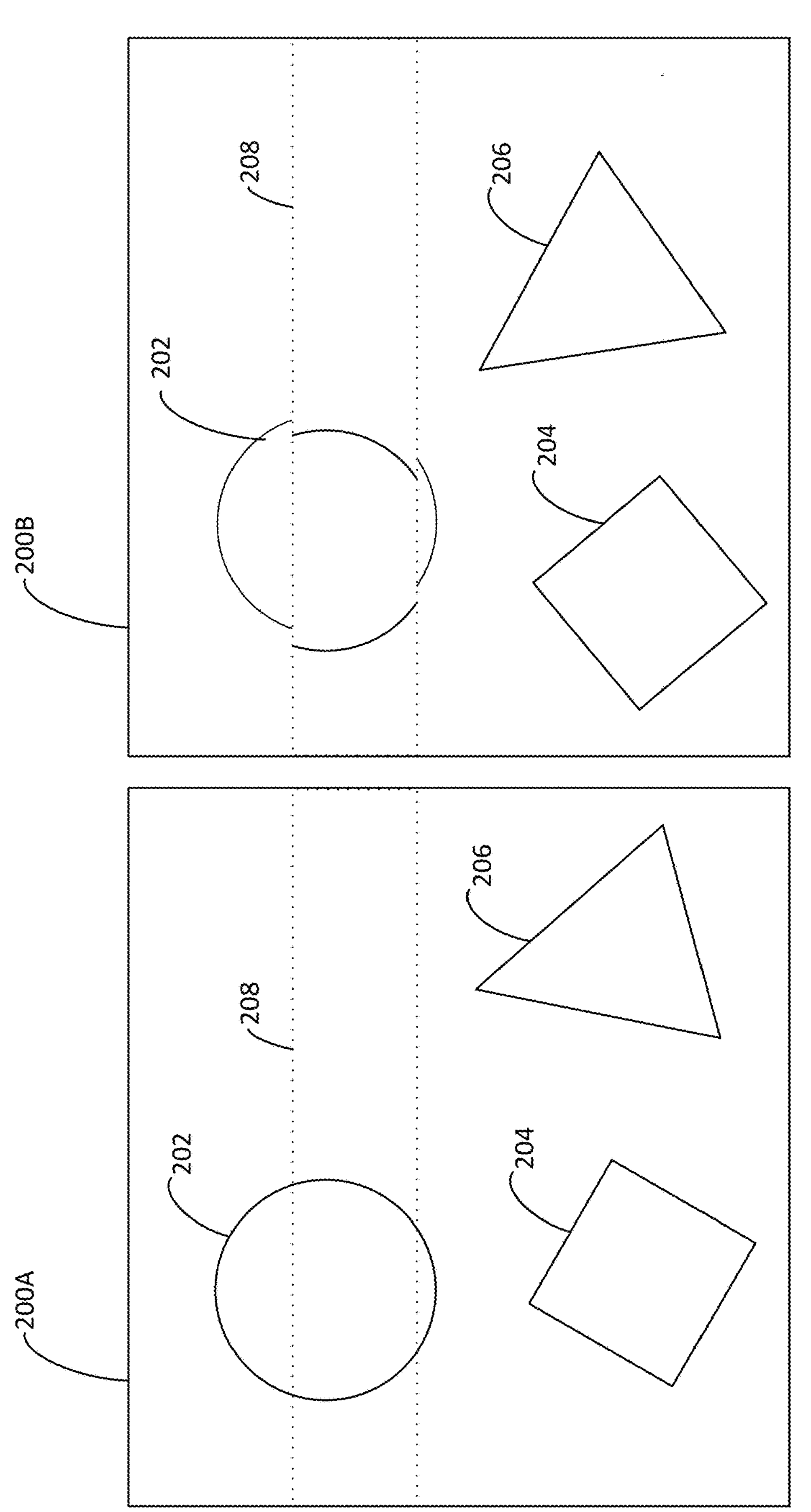
FIGS. 2A and 2B depict example diagrams of consecutive frames that may be rendered by the system shown in FIG. 1, in accordance with some embodiments of the present disclosure.

As a result of the insertion of the "no-op" indication (e.g., encoding that does not change the corresponding region of the video frame relative to the previous frame) in the encoded bitstream assembled by the depacketizer, the region of the video frame, when decoded by the decoder 106 and rendered by the renderer 108, will include portions of the previous video frame in place of the regions of the current frame corresponding to the network packets 122 that were dropped during transmission. Examples of consecutive frames showing this error concealment are shown in FIGS. 2A and 2B.

Because the network packets 122 including video streaming data may be transmitted out of order, the video streaming data received by the receiver system 101 may include video data from subsequent frames. In some implementations, the receiver system 101 may replace one or more missing packets with corresponding video feed information from future video frames, if the same regions (e.g., location within the frame) as the lost frame regions have been received for the subsequent frame. To do so, the depacketizer 104 may modify the encoded bitstream to include encoded video data from the subsequent frame in place of the regions of the encoded bitstream that were lost during transmission.

One other approach to error concealment is to provide data to the renderer 108 that indicates which regions of the video frame are missing. The renderer 108 can then use this information to conceal the errors by rendering the decoded video data of the same one or more regions of the previous frame rather than artifacts or "garbage" data in place of the missing one or more regions of the video, as described in further detail herein. After assembling, and in some implementations modifying, the encoded bitstream 120, the depacketizer 104 can provide the assembled encoded bitstream 120 to the decoder 106.

The decoder 106 can receive, parse, and decode the encoded bitstream assembled by the depacketizer 104. To do so, the decoder 106 can parse the encoded bitstream to extract any associated video metadata, such as the frame size, frame rate, and audio sample rate. In some implementations, the decoder 106 can identify the codec based at least on the metadata and decode the encoded bitstream using the identified codec to generate data video and/or audio data. In some implementations, such video metadata may be transmitted in one or more packets that are separate from the network packets 122 that include video data. This may include decompressing or performing the inverse of any encoding operations used to generate the encoded bitstream 120 at the streaming server 110. The decoder 106, upon generating the decoded video data for a frame of video, can provide the decoded video frame data to the renderer 108 for rendering. In implementations where the decoded video frame data was not modified to include no-op operations, as described herein, the decoded video frame data may include visual artifacts that may be concealed by the renderer 108 based at least on data identifying the dropped packets provided by the depacketizer 104.

The renderer 108 can render and display the decoded video data received from the decoder 106. The renderer 108 can render the decoded video data and display it on any suitable display device, such as a monitor, a television, or any other type of device capable of displaying decoded video data. To do so, the renderer 108 can store the decoded video data in a frame buffer. The renderer 108 can then scan out the frame buffer contents for the current frame to the display device. In some implementations, the renderer 108 may perform multiple layers of rendering, such as overlaying graphics or text on top of the video frames.

In implementations where the renderer 108 implements error concealment, the renderer 108 can receive indications of one or more regions of the current frame that were lost during transmission. The indications may be coordinates corresponding to the missing region, or an identifier of a particular region (e.g., slice or tile) that was lost, which the renderer 108 can utilize to determine the coordinates corresponding to the missing region. To determine the coordinates of the missing region, the renderer 108 may utilize information from metadata of the video stream that indicates the size of each region. The renderer 108 can then map the identifier of the missing region(s) to corresponding pixel locations on the video frame.

Once the missing regions of the video frame have been identified by the renderer 108, the renderer 108 can cause corresponding regions from the previously displayed frame to be rendered in lieu of the missing regions (which may include incomplete or corrupted data). To do so, the renderer 108 may copy corresponding pixel data corresponding to the missing regions from one or more frame buffers that store the decoded video data from the previously rendered frame into the region of memory in the frame buffer storing missing region(s) of the frame to be rendered. The renderer 108 can then draw the data in the frame buffer, which will include portions of the previous video frame in place of the regions of the current frame that were dropped during transmission.

In some implementations, rather than copying from a previous frame buffer, the renderer 108 may only update the frame buffer for the current frame with data that is valid. For example, the renderer 108 may discard decoded video data from the decoder 106 if that data is identified as corresponding to invalid data (e.g., a dropped packet). Said data may be identified as invalid based at least on a corresponding indication from the depacketizer 104, as described herein. In some implementations, the renderer 108 can mask off the region that was lost using scissor or clip rectangles or depth or stencil buffers when rendering the frame. Examples of consecutive frames showing the error concealment techniques described herein are shown in FIGS. 2A and 2B. Although the foregoing has been described in connection with RTP packets, it should be understood that any suitable streaming protocol may be utilized that can be used to map between transmitted packets and frame regions.

Referring to FIGS. 2A and 2B, depicted are example consecutive frames 200A and 200B, respectively, which may be rendered by renderer 108 of the system shown in FIG. 1, in accordance with some embodiments of the present disclosure. As shown in FIG. 2A, a frame 200A is shown depicting displayed objects such as the circle 202, the square 204, and the triangle 206 in initial positions. Other display elements such as displayed background are not shown for clarity. In this non-limiting example, a region 208 of the frame 200A is a horizontal slice that spans the width of the frame 200A. The frame 200A includes other slices having the same size but are located at different locations of the frame 200A. However, it should be understood that regions of the video frames described herein may include any geometric shape or configuration, such as rectangular or square tiles, as well as contiguous sequences of macroblocks, which may span multiple rows of macroblocks.

FIG. 2B shows the consecutive frame 200B that is subsequent to the frame 200A. As shown, most regions of the frame depict the circle 202, the square 204, and the triangle 206 at updated positions, consistent with the change in frame. This is due to the other regions of the frame 200B including those objects are successfully and timely received. However, in this non-limiting example, packets storing the data that encodes the region 208 of the frame 200B were not received (e.g., within a predetermined time period for displaying the frame 200B without latency). As shown, the error concealment techniques described herein have been applied to the frame 200B, such that the corresponding region 208 from the preceding frame 200A is shown in place of the dropped frame region of the frame 200B. Although this minor artifact is shown, such errors are concealed in streaming media because frames are updated frequently and tend to be similar to the immediately preceding frame. Additionally, avoiding time-intensive retransmission of dropped packets makes the techniques described herein suitable for real-time or near real-time applications, such as game streaming. In other examples, the dropped frame region 208 can be replaced by the corresponding region of a subsequent frame as described herein.

Figure 3:
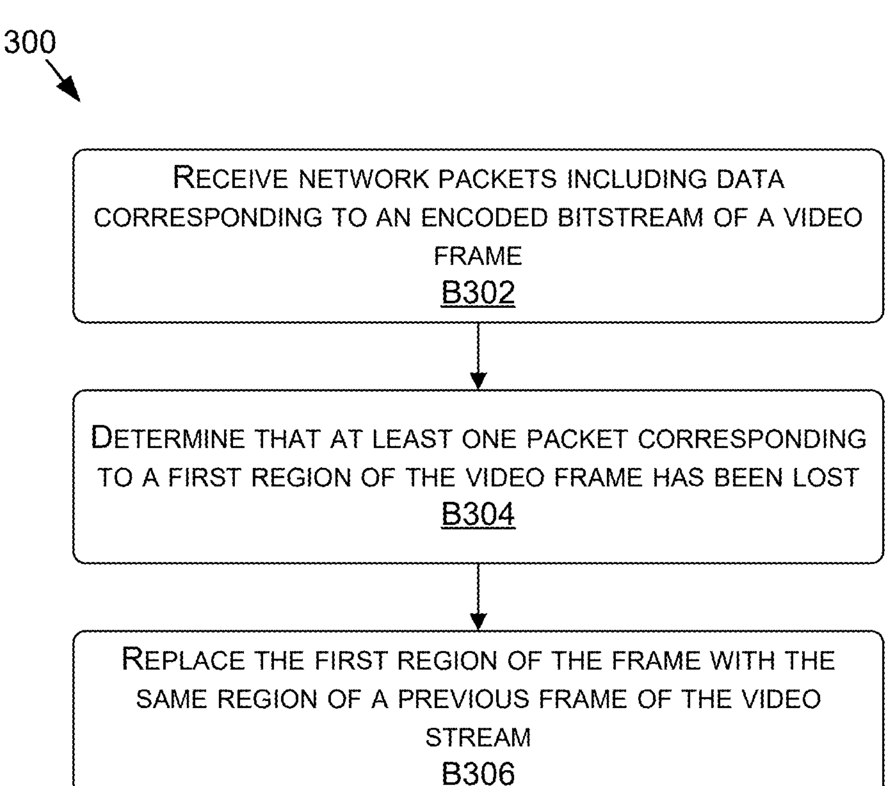
FIG. 3 is a flow diagram of an example of a method for error concealment by replacing a lost video frame region with a chronological predecessor, in accordance with some embodiments of the present disclosure.

Now referring to FIG. 3, each block of method 300, described herein, includes a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the system of FIG. 1. However, this method may additionally or alternatively be executed by any one system, or any combination of systems, including, but not limited to, those described herein.

FIG. 3 is a flow diagram showing a method 300 for error concealment by replacing a lost video frame region with a chronological predecessor, in accordance with some embodiments of the present disclosure. The method 300, at block B302, includes receiving network packets including data corresponding to an encoded bitstream of a video frame. The network packets may be transmitted from a streaming server and received by a receiver system. The network packets may be UDP packets having payloads that include packets corresponding to a streaming protocol such as RTP, or any other streaming protocol that provides a mapping between subsets of frame regions and streaming protocol packets. The encoded bitstream can be encoded according to an codec standard such as, for example and without limitation, h.264, h.265, h.266, VP8, VP9, or AV1, for example. The encoded bitstream may contain regions of each frame of the video stream, where each region may be a slice or a tile, which may have at least one dimension that is lesser than or equal to dimensions of the frame.

The method 300, at block B304, includes determining that at least one packet corresponding to a first region of the video frame has been lost. A packet may be determined as being lost based at least on the packet for the frame not being received within a predetermined time period (e.g., a timeout). When received, the packets may be stored in a buffer and ordered according to the sequence numbers stored in the headers of the streaming protocol packets storing the encoded video data. If one or more expected sequence numbers in the buffer are missing (e.g., based at least on the order of the stored packets in the buffer) after a predetermined time period of receiving the first packet of the video frame, the packets corresponding to the missing expected sequence numbers can be flagged as lost.

The method 300, at block B306, includes replacing the first region of the frame with the same region of a previous frame of the video stream. Replacing the region may include modifying the encoded bitstream. For example, a no-op operation may be added to the bitstream in place of the missing regions of encoded video data. Non-limiting example no-op operations include "no-operation" slices for h.264-compliant codecs, or "zero motion" or "zero residuals" slices, tiles, or regions for other types of codecs. The modified bitstream can then be decoded and rendered, causing the missing portions of the video frame to instead be replaced with corresponding portions from the previous frame.

In some implementations, to replace the missing region of the frame with the same region from the previous frame, the encoded bitstream may first be decoded to generate decoded video data. The decoded video data can then be modified to include decoded data from the region of the previous frame of the video stream corresponding to the missing region of the frame. The decoded data from one or more previous frames may be stored to compensate for missing data in the received frames. The modified decoded video data can then be rendered as described herein, causing the missing portions of the video frame to instead be replaced with corresponding portions from the previous frame.

Example Content Streaming System

Figure 4:
FIG. 4 is a block diagram of an example content streaming system suitable for use in implementing some embodiments of the present disclosure.
Figure 4:
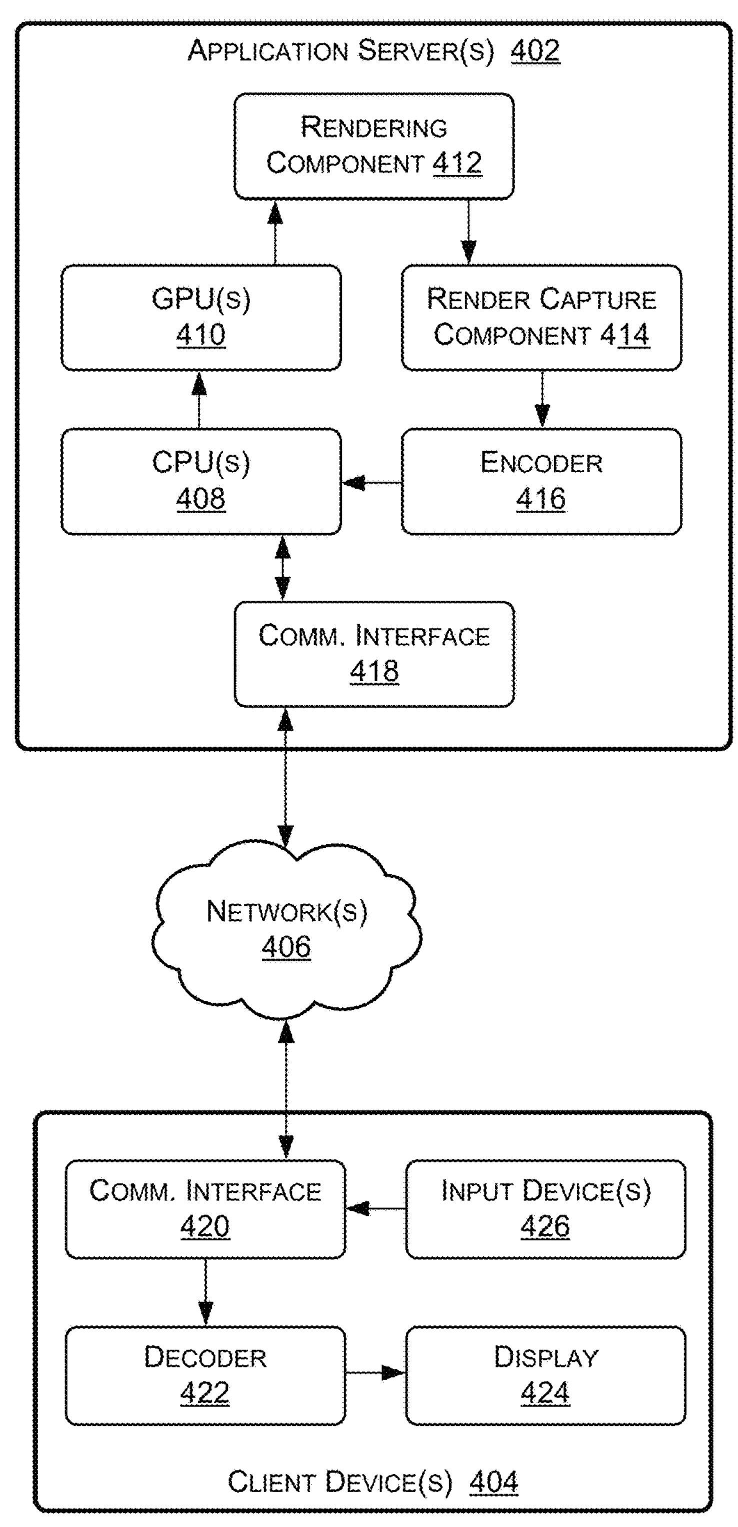

Now referring to FIG. 4, FIG. 4 is an example system diagram for a content streaming system 400, in accordance with some embodiments of the present disclosure. FIG. 4 includes application server(s) 402 (which may include similar components, features, and/or functionality to the example computing device 500 of FIG. 5), client device(s) 404 (which may include similar components, features, and/or functionality to the example computing device 500 of FIG. 5), and network(s) 406 (which may be similar to the network(s) described herein). In some embodiments of the present disclosure, the system 100 may be implemented by one or more components of the system 400 shown in FIG. 4. The application session may correspond to a game streaming application (e.g., NVIDIA Geforce NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 400, for an application session, the client device(s) 404 may only receive input data in response to inputs to the input device(s) 426, transmit the input data to the application server(s) 402, receive encoded display data from the application server(s) 402, and display the display data on the display 424. As such, the more computationally intense computing and processing is offloaded to the application server(s) 402 (e.g., rendering—in particular, ray or path-tracing—for graphical output of the application session is executed by the GPU(s) of the game server(s) 402). In other words, the application session is streamed to the client device(s) 404 from the application server(s) 402, thereby reducing the requirements of the client device(s) 404 for graphics processing and rendering.

For example, with respect to an instantiation of an application session, a client device 404 may be displaying a frame of the application session on the display 424 based at least on receiving the display data from the application server(s) 402. The application server(s) 402 may implement any of the functionality of the streaming server 110 described in connection with FIG. 1. The client device 404 may receive an input to one of the input device(s) 426 and generate input data in response. The client device 404 may transmit the input data to the application server(s) 402 via the communication interface 420 and over the network(s) 406 (e.g., the Internet), and the application server(s) 402 may receive the input data via the communication interface 418. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 412 may render the application session (e.g., representative of the result of the input data), and the render capture component 414 may capture the rendering of the application session as display data (e.g., as image data capturing the rendered frame of the application session). The rendering of the application session may include ray or path-traced lighting and/or shadow effects, computed using one or more parallel processing units-such as GPUs, which may further employ the use of one or more dedicated hardware accelerators or processing cores to perform ray or path-tracing techniques—of the application server(s) 402. In some embodiments, one or more virtual machines (VMs)—e.g., including one or more virtual components, such as vGPUs, vCPUs, etc.—may be used by the application server(s) 402 to support the application sessions. The encoder 416 may then encode the display data to generate encoded display data and the encoded display data may be transmitted to the client device 404 over the network(s) 406 via the communication interface 418. The client device 404 may receive the encoded display data via the communication interface 420 and the decoder 422 may decode the encoded display data to generate the display data. The client device 404 may then display the display data via the display 424. The client device 404 may implement any of the functionality of the receiver system 101 described in connection with FIG. 1.

The systems and methods described herein may be used for a variety of purposes, by way of example and without limitation, machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing, and/or any other suitable applications.

Disclosed embodiments may be used in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems incorporating one or more language models, systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Computing Device

Figure 5:
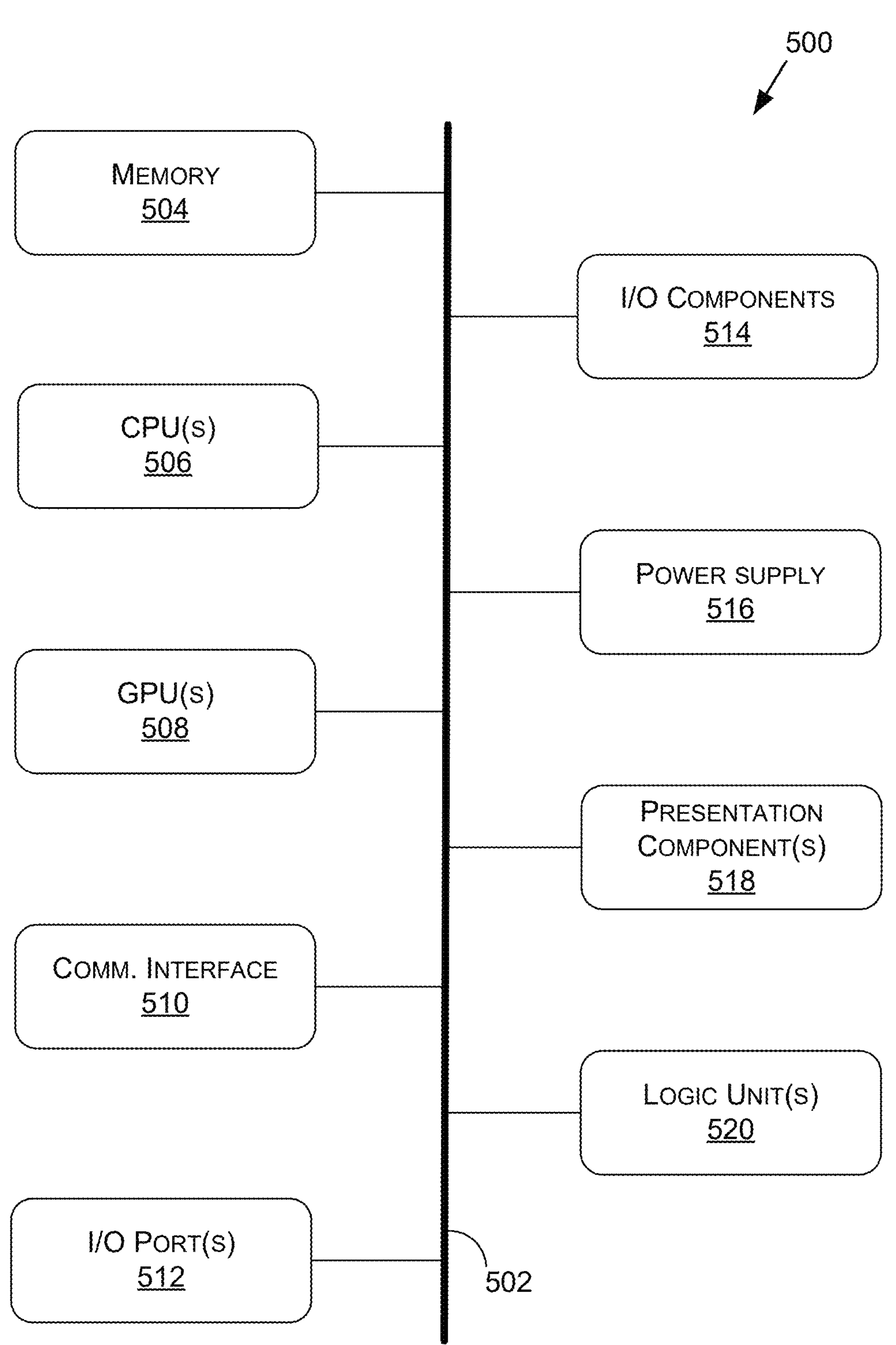
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may include one or more virtual machines (VMs), and/or any of the components thereof may include virtual components (e.g., virtual hardware components). For non-limiting examples, one or more of the GPUs 508 may include one or more vGPUs, one or more of the CPUs 506 may include one or more vCPUs, and/or one or more of the logic units 520 may include one or more virtual logic units. As such, a computing device 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may include computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system). Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not include signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be implemented/configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be implemented/configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506) and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLink) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be implemented/configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., to a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. A NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.) and output the data (e.g., as an image, video, sound, etc.).

Example Data Center

Figure 6:
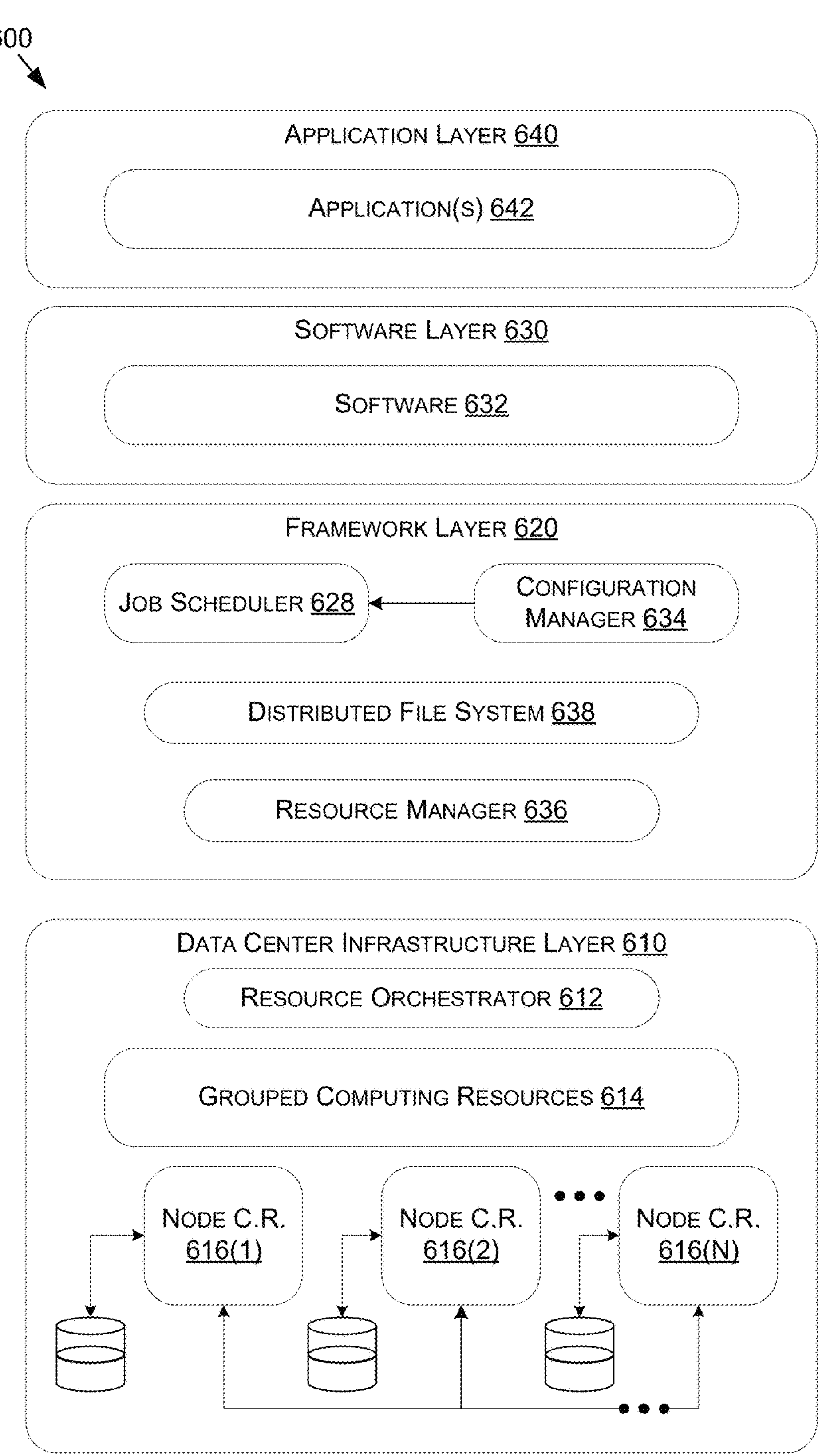
FIG. 6 is a block diagram of an example data center suitable for use in implementing some embodiments of the present disclosure.

FIG. 6 illustrates an example data center 600 that may be used in at least one embodiment of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-(N) may include one or more virtual components, such as vGPUs, vCPUs, and/or the like, and/or one or more of the node C.R.s 616(1)-616 (N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory, or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 628, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 628 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 628. In at least one embodiment, clustered or grouped computing resources may include grouped computing resources 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616 (N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based at least on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software, or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or a combination thereof. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, the functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
- one or more circuits to:
  - receive, from one or more servers, a plurality of network packets of an encoded bitstream, the network packets of the plurality of network packets including data corresponding to one or more regions of a frame of a video stream;
  - determine that at least one network packet of the encoded bitstream has been lost, the at least one network packet corresponding to a first region of the frame; and
  - in response to determining that the at least one network packet has been lost, replace data corresponding to the first region of the frame with data corresponding to a same region of a previous frame of the video stream by modifying the encoded bitstream to include a flag representing a no-op operation of a codec of the encoded bitstream with respect to the first region of the frame.

2. The processor of claim 1, wherein the one or more circuits are to determine that the at least one network packet corresponding to the frame has been lost based at least on a timeout.

3. The processor of claim 1, wherein the plurality of network packets is received via a user datagram protocol (UDP).

4. The processor of claim 1, wherein the encoded bitstream of the video stream is formatted for network transport based at least on the real-time transport protocol (RTP).

5. The processor of claim 1, wherein the first region of the frame is a horizontal slice of the frame, the horizontal slice having a same width as the frame.

6. The processor of claim 1, wherein the first region of the frame is a rectangular tile of the frame, the rectangular tile having at least one dimension that is lesser than or equal to dimensions of the frame.

7. The processor of claim 1, wherein the codec of the encoded bitstream comprises at least one of:
- h.264;
- h.265;
- h.266;
- VP8;
- VP9; or
- AV1.

8. The processor of claim 1, wherein the processor is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system incorporating one or more language models;
- a system implemented at least partially in a data center; or
- a system implemented at least partially using cloud computing resources.

9. A system comprising:
- one or more processing units; and
- one or more memory units storing instructions that, when executed by the one or more processing units, cause the one or more processing units to execute operations comprising:
  - receiving, using one or more servers, a plurality of network packets of an encoded bitstream, network packets of the plurality of network packets including data corresponding to one or more regions of a frame of a video stream;
  - determining that at least one network packet has been lost, the at least one network packet corresponding to a first region of the frame; and
  - in response to determining that the at least one network packet has been lost, replacing data corresponding to the first region of the frame with data corresponding to a same region of a previous frame of the video stream by modifying the encoded bitstream to include a flag representing a no-op operation of a codec of the encoded bitstream with respect to the first region of the frame.

10. The system of claim 9, wherein the system is comprised in at least one of:

a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system incorporating one or more language models;
a system implemented at least partially in a data center; or
a system implemented at least partially using cloud computing resources.

11. The system of claim 9, wherein the instructions, when executed by the one or more processing units, cause the one or more processing units to execute further operations comprising determining that the at least one network packet corresponding to the frame was lost based at least on a timeout.

12. A method, comprising:
receiving, using one or more processors and from one or more servers, a plurality of network packets of an encoded bitstream, network packets of the plurality of network packets including data corresponding to one or more regions of a frame of a video stream;
determining, using the one or more processors, that at least one network packet has been lost, the at least one network packet corresponding to a first region of the frame; and
in response to determining that the at least one network packet has been lost, replacing, using the one or more processors, data corresponding to the first region of the frame with data corresponding to a same region of a previous frame of the video stream by modifying the encoded bitstream to include a flag representing a no-op operation of a codec of the encoded bitstream with respect to the first region of the frame.

* * * * *